Oct. 28, 1969   R. NORTON ET AL   3,475,095
APPARATUS FOR PRODUCING PHOTOGRAPHIC PRINTS
BY HEAT DEVELOPMENT
Filed Aug. 8, 1966
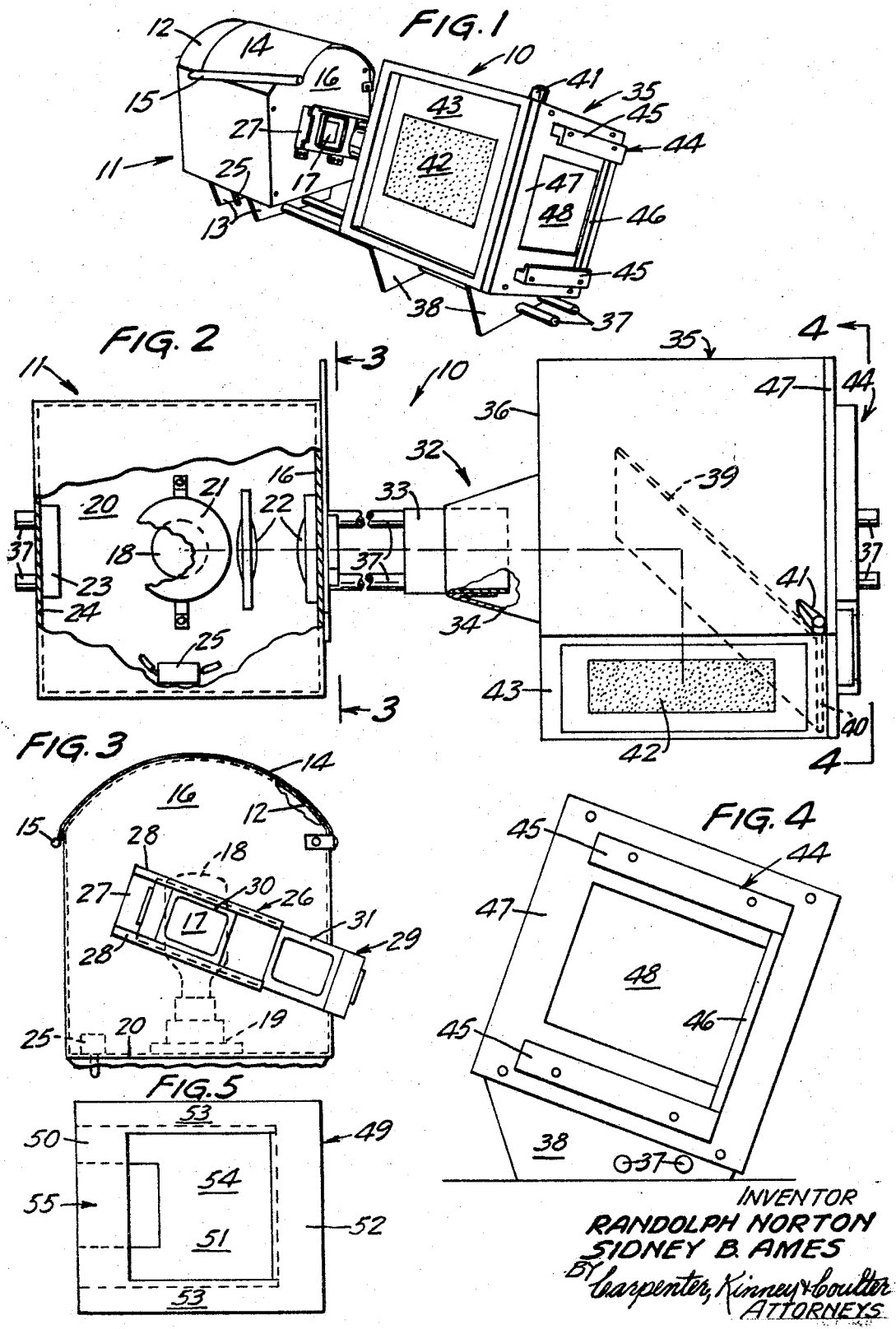
INVENTOR
RANDOLPH NORTON
SIDNEY B. AMES
BY Carpenter, Kinney & Coulter
ATTORNEYS

United States Patent Office 3,475,095
Patented Oct. 28, 1969

3,475,095
APPARATUS FOR PRODUCING PHOTOGRAPHIC PRINTS BY HEAT DEVELOPMENT
Randolph Norton, White Bear Lake, and Sidney B. Ames, Minneapolis, Minn., assignors to Minnesota Mining and Manufacturing Company, St. Paul, Minn., a corporation of Delaware
Filed Aug. 8, 1966, Ser. No. 570,992
Int. Cl. G03b 27/32, 27/52, 13/28
U.S. Cl. 355—27     4 Claims

ABSTRACT OF THE DISCLOSURE

Apparatus for viewing photographic slides and for producing photographic prints of developed negatives directly on a photosensitive sheet by heat development and without the conventional chemical developing step. The apparatus comprises a light-heat unit having a light source and a heat source, an enlarging lens system and an exposure-viewer unit having an exposure station, a viewing screen and a pivotable reflecting panel which serves to reflect a projected image onto the viewing screen and also serves as the shutter to project the image to the exposure station.

---

The present invention relates to novel and useful apparatus for viewing photographic slides and for producing prints or enlargements of photographic negatives by a process in which the image is reproduced directly without the conventional chemical developing step.

Apparatus for producing enlarged prints of information stored on microfilm are part of the prior art. These prior art machines generally comprise an image projection system including a projection lamp, condensing and enlarging lenses, microfilm supply and take-up reels, and a viewing screen; and an exposing and developing system including a shutter mechanism, a photosensitive paper supply and feed means and a developing means, all suitably enclosed in a case or container. Such commercial devices generally are relatively large sophisticated pieces of automatic or semi-automatic machinery, consequently requiring negatives of substantially uniform contrast and density, and so far as is known, all of them require a separate energy source for exposing and developing the photosensitive sheet. In contrast, the device of the present invention is extremely simple in construction and operation, can handle a wide variety in contrast and density of negatives, utilizes a single energy source for exposing and developing the photosensitive sheet and has other features differing from the prior art as will become apparent from the following description and drawings.

An object of this invention is to provide unitary self-contained apparatus which can be used to produce enlargements of photographic negatives on photosensitive paper which does not require chemical solutions for either a developing step or a fixing step.

Another object is to provide apparatus which can also be used as a slide viewer for photographic slides.

Still another object is to provide apparatus for making contact prints from photographic negatives.

A still further object is to provide durable apparatus of extremely simple construction and mode of operation so that the device may be used as a toy.

These and other objectives and advantages will become readily apparent to those skilled in the art from the following detailed description and disclosure, especially in light of the accompanying drawings, wherein like numerals refer to corresponding parts in the several diagrammatic views, and in which:

FIGURE 1 is a perspective elevational view of a machine of the present invention;

FIGURE 2 is a top view, partly broken away, showing the relationship of various components of the machine of FIGURE 1;

FIGURE 3 is an end elevational view of the light-heat housing taken along line 3—3 of FIGURE 2, showing a slide holder in place;

FIGURE 4 is an end elevational view of the exposure and viewer unit taken along line 4—4 of FIGURE 2 showing the receptacle for the paper holder; and FIGURE 5 is a plan view of the paper holder.

Referring now to FIGURES 1 and 2, the illustrated embodiment of the present invention comprises a viewer-enlarger 10, including a light-heat unit 11, an enlarging lens 32 and an exposure and viewer unit 35.

Light-heat unit 11 is an enclosed substantially cubical light-tight container (each side being approximately 6¾ inches square) formed of an inexpensive, rigid and tough plastic material such as polypropylene with a removable arcuate top 12 of a heat conductive material such as metal, and supported by two trapezoidal legs 13. Aluminum is hte presently preferred material for top 12 due to its lightness, durability, excellent heat conductive properties, freedom from maintenance and economy. A thin heat resistant insulating material (not shown) such as a silk screen is laminated to top 12 to insure uniformity in heat dissipation from top 12. Affixed to one straight edge of top 12 is a heat-resistant transparent hold down member 14, such as a silk screen which functions to uniformly press an exposed photosensitive sheet against the surface of top 12 during the heat development step of the photosensitive sheet. The free edge of hold down member 14 is provided with a suitable handle member 15 which may be grasped by the user in applying uniform pressure to the exposed photosensitive sheet placed between it and top 12. In the illustrated embodiment, the handle member 15 is a wooden dowel approximately ⅜″ in diameter over which the silk screen has been rolled and suitably fastened as by being stapled. Of course, the heat resistant insulating material and the hold down member 14 could be fabricated into a unitary structure much in the nature of an envelope, thus eliminating the need for laminating the heat resistant insulating material to top 12.

Side wall 16 of light-heat unit 11 adjacent to and in alignment with the enlarging lens 32 is provided with a centrally located rectangular aperture 17 measuring approximately 1⅜ inch by 1 inch, which bisects the horizontal center line of side wall 16 at an angle of 20° and is tilted downward from front to rear as shown in FIGURES 1 and 3. The reason for this tilt will be discussed more fully hereinafter.

Light-heat unit 11 has therein a projection lamp 18 comprising a conventional clear, non-frosted incandescent light bulb of 100 to 150 watts mounted in a conventional screw socket 18 suitably fastened to the bottom plate 20 of light-heat unit 11. A standard 150 watt projection lamp may be used in place of an incandescent light bulb. An important feature of the present invention is that the projection lamp 18 also serves as the heat source for the development step in the projection of photographic prints or enlargements. This fact is especially important when the apparatus is being operated by children as a toy. Experience has shown that children, especially younger children, are aware of the hazard of touching a glowing light bulb and associated apparatus—yet these same children will readily "play" with other heat sources, especially a glowing resistance heating element. Projection lamp 18 is provided with a baffle 21 which serves as a light and heat diffuser.

A pair of conventional condensing lenses 22 of optical glass or plastic is suitably mounted in a vertical position between the projection lamp 18 and aperture 17. If desired, one of the condensing lenses may be a heat absorbing lens so that the slide or negative will not be greatly affected by the heat generated by projection lamp 18.

A conventional adjustable leaf thermostat 23, wired in series with projection lamp 18, is suitably mounted on end wall 24 of the light-heat unit 11. Thermostat 23 functions to keep the temperature of top 12 within a temperature range of 185° F. and 215° F., ±2½° F. Mounted on the exterior of the bottom plate 20 of light-heat unit 11 is a double pole double throw toggle switch 25 wired in series with projection lamp 18 and in parallel with thermostat 23. Toggle switch 25 enables thermostat 23 to be bypassed, thus providing a bypass lamp circuit to assure uninterrupted exposure of the slides for projection.

A slide or film holder receptacle 26, which comprises a back plate 27 and side rails 28 whose upraised right-angularly formed sides form a channel for frictionally removably receiving slide holder 29, is suitably fastened to end wall 16 of light-heat unit 11. Slide holder receptacle 26 and slide holder 29 are, of course, also tilted at an angle of 20°. A film holder (not shown) capable of accommodating photographic negatives such as 35 mm. size (24 mm. x 36 mm.) or 126 size (29 mm. x 29 mm.), in individual frames or strip form, may be similarly mounted in the slide or film holder receptacle 26, in place of slide holder 29 when making photographic prints or enlargements with the apparatus of the present invention.

Enlarging lens 32 comprises a cylindrical metal or plastic lens barrel 33 containing conventional optical glass or plastic enlarging lens and a metal or plastic lens mount 34. The lens mount 34 of the enlarging lens 32 in the illustrated embodiment is suitably fastened to end wall 36 of the exposure and viewer unit 35, although it is obvious that the enlarging lens may be independently mounted or mounted to light-heat unit 11, without departing from the scope of this invention. The enlarging lens 32 provides an approximate 3.6× magnification and is a three-element 50 mm. enlarging lens having a fixed $f$ 3.5 aperture and a fixed optical path of 11.75 inches. Focusing is accomplished by sliding the lens barrel 33 in lens mount 34. A much simpler machine may be devised by providing a fixed lens, i.e., where the lens is permanently secured in the mount, and a fixed film and paper plane. Such a machine would require no focusing and accordingly would be admirably suited for use as a toy by young children.

Exposure and viewer unit 35 is an enclosed substantially cubical container (each side being approximately 7 inches square) formed of plastic and interconnected with light-heat unit 11 and enlarging lens 32 to form an integrated unit. In the illustrated embodiment, exposure and viewer unit 35 (and enlarging lens 32 if independently mounted) is connected to light-heat unit 11 by two metal connecting rods 37. The units may be made movable relative to each other by sliding along the interconnecting rods 37. It is understood, of course, that any suitable interconnecting means may be utilized, e.g., the units may even be integrally molded together.

It will be noted that exposure and viewer unit 35 is supported by two legs 38, which are also inclined at an angle of 20°, such that the exposure and viewer unit 35 is downwardly tilted from front to back. This tilt is the same as the tilt of the aperture 17 and slide holder 25.

A rectangular reflecting panel 39, such as a conventional glass mirror, which pivots around an axis 40 and is controlled by lever 41, which also visually indicates the position of the reflective panel, is mounted on the interior of exposure and viewer unit 35. Reflector panel 39 serves as a means for reflecting the projected image on a frosted viewing screen 42 and also serves as the shutter when photographic prints or enlargements are being made with the apparatus. The frosted viewing screen 42 forms part of the front panel 43 of the exposure and viewer unit 35. Because of the aforenoted downward tilt of the exposure and viewer unit 35, viewing screen 42 is inclined backwardly at an angle of 20°, thus making it convenient to view slides projected onto the viewing screen 42 and additionally assures distortion-free viewing of the projected image. It is understood, of course, that if one desired to devise a slide viewer, the heretofore described apparatus would serve this purpose exemplarily. In fact, the reflecting panel 39 could be rigidly secured to the interior of the viewer unit 35.

A paper holder receptacle 44 of plastic or metal (FIGURES 1, 2 and 4) comprises a pair of right angularly formed side rails 45 joined together at one end by a cross member 46, and secured to end wall 47 of the exposure and viewer unit 35 remote from and in alignment with the enlarging lens 32. End wall 47 is provided with a centrally located rectangular aperture 48 measuring approximately 3½ inches by 4½ inches, which, because of the tilt of the exposure and viewer unit 35, is also downwardly tilted at an angle of 20° from front to rear.

Paper holder 59 of plastic or metal (FIGURE 5), which slips into receptacle 44 and is designed to accommodate a sheet of photosensitive paper for light exposure through the enlarging lens system 32, comprises a front plate 50 having an aperture 51 therein of appropriate size to serve as a paper mask, a bottom spacer 52 and two side spacers 53, which spacers 52, 53 serve to center and align the paper with respect to the paper mask, and a back plate 54 with a marginal centrally cut out rectangular portion 55, whose bottom edge extends below the top edge of the aperture 51 in the front plate 50 and thus facilitates removal of an exposed photosensitive sheet therefrom. The top edges of the front plate 50 and side spacers 53 are each beveled from back to front at an angle of 45°; back plate 54 is beveled from front to back at an angle of 45° and the portion of front plate 50 which forms the bottom edge of aperture 51 is also similarly beveled at an angle of 45° from back to front to permit a sheet inserted into the paper holder to abut the bottom spacer 52. When 126 size negatives are being enlarged in the illustrated device, paper holder 59 accommodates a sheet of photosensitive paper measuring about 4 inches square, the aperture 51 then being approximately 3½ inches square. Similarly, when 35 mm. size negatives are being enlarged, paper holder 49 accommodates a sheet of photosensitive paper about 4 inches by 5 inches, the aperture 51 in front plate 50 then being approximately 3½ inches by 4½ inches. It is apparent that enlargements of any suitable size may be produced by altering the dimensions of the viewing or focusing screen 42, paper holder 49, the photosensitive sheet, aperture 48 in the exposure and viewer unit 35 and the optical path (i.e., the distance between the film and the screen or paper plane). Enlargements as large as 5 x 7 inches have been successfully made with the apparatus of the present invention.

Any photosensitive sheet which is heat-developable within a temperature range of about 150° F. to about 220° F. may be used to produce photographic prints or enlargements with the apparatus of the present invention. Sheets of this type are fully disclosed in Sorenson and Shepard United States Patent No. 3,152,904, and comprise a backing having coated thereon a composition comprising a radiation-sensitive component and an image forming component which is substantially latent under ambient conditions but which can be initiated into reaction to produce a visible image by a reaction product of the irradiated radiation-sensitive component and upon being heated to a temperature above about 150° F.

Referring now to FIGURES 1 and 3, it was previously noted that the top 12 of lamp housing 11 was of a smoothly arcuate configuration. In the illustrated embodiment, the top 12 is a segment of a circle having a four inch radius. The top 12 is utilized in the heat developing step in the preparation of either enlargements or contact prints. Heat emitted by projection lamp 18 is diffused by baffle 21 and absorbed by top 12, which is coated on its interior with an appropriate radiant energy absorbing material, e.g., flat black paint. The baffle 21 thus serves to prevent the area of top 12 immediately above projection lamp 18 from becoming hotter than the remaining areas of said top. In practice, it has been found that the baffle 21 insures temperature uniformity of the top 12 to within ±5° F. throughout the entire area thereof. In order to maintain the temperature of top 12 within usable limits, i.e., about 185–215° F., ±2.5° F., thermostat 23 is wired in series with projection lamp 18. Toggle switch 25, wired in series with projection lamp 18 and in parallel with thermostat 23 enables one to bypass thermostat 23 when the apparatus is utilized as a slide viewer. A microswitch (not shown) mounted interiorly of front panel 43 of exposure and viewing unit 35, is wired in parallel with toggle switch 25 and also serves to bypass thermostat 23 when reflective panel 39 is used as a shutter in making photographic prints or enlargements and is pivoted from the position shown in FIGURE 2 and against front panel 43, thus making contact with the micro-switch mounted on said front panel 43. Bypassing of thermostat 23 in this manner permits projection lamp 18 to remain lit during the period of such exposure.

In operation as a slide viewer, a developed positive transparency slide 30 is inserted in slide holder 29 and moved into position before aperture 17 for projection through enlarging lens 32 and onto viewing screen 42 via reflecting panel 39 which has been swung into the position as shown in FIGURE 2 by lever 41. Of course, it is understood that lamp 18 has been connected to a 110 v. electrical current source (not shown) and toggle switch 25 has been properly thrown to bypass thermostat 23 so that projection lamp 18 is on. The projected image on screen 42 is then focused by manipulating the lens barrel 33 of the enlarging lens 32. In the interim another slide 31 will have been inserted into slide holder 29 in readiness for projection.

In operation as a photographic enlarger, thermostat 23 is in the circuit and will be operative except when the photosensitive sheet is being exposed, whereupon the microswitch mounted on front panel 43 which is activated by panel 39 will insure that the projection lamp 18 will be "on" for the duration of the required exposure which is typically on the order of 5 to 10 seconds. In making an enlargement, the film holder previously described may be used in place of slide holder 29. A developed negative containing an image is inserted in the film holder and properly centered in aperture 17 for projection onto viewing screen 42. It should be noted that the dimensions of viewing screen 42 correspond to the dimensions of aperture 48, thus enabling the operator of the machine to perform any necessary or desirable cropping of the projected image at this point in the enlarging process. After proper focusing on screen 42 as described above, and after insertion of the paper holder 49, with a photosensitive sheet therein (sensitive side facing lamp 18), into receptacle 44, the reflecting panel 39 is pivoted from the position of FIGURE 2 into contact with front panel 43 by lever 41 and the photosensitive sheet is exposed. Thereafter, reflecting panel 39 is pivoted to its first position, shutting off the exposure thus acting as a shutter. The dimensions of reflecting panel 39 are such that substantially all of the projected light is directed either onto viewing screen 42 or through aperture 48 onto the photosensitive sheet. Thus, it can be said that exposure and viewer unit 35 is light-tight. The exposed photosensitive sheet is then removed from the paper holder 49 and placed, sensitive side up, onto top 12 of light-heat unit 11 for heat-developing. In order to facilitate the application of heat uniformly over the entire area of the exposed photosensitive sheet, silk screen hold down member 14 is placed over the sheet and tightly drawn down by grasping handle 15. Upon exposure to heat for approximately 5 seconds, a visible reproduction will appear and an enlarged print of the negative image is produced. Visual control of the development time is possible because of the transparency of hold down member 14. Visual control of the development step is significant since the gamma of the reproduced image can be controlled by over-exposing and under-developing or vice versa. Similarly, visual development can be used to control the density of the reproduced image. Perhaps a more significant and practical aspect of visual development is that it enables negatives of widely varying contrast to be used in the device of the present invention. Thus, the present invention is equally suited to the needs of the serious amateur photographer as well as serving as an interesting and educational toy for children of all ages. All development ceases when the photosensitive sheet is removed from the top 12 since development occurs only on the application of heat. The photographic prints thus produced are substantially permanent under ambient conditions. It is understood, of course, that all of the foregoing operations are preferably carried out under subdued light conditions, e.g., a photographic "safe light."

When used as a contact printer, a composite of a suitable negative and photosensitive sheet is inserted into paper holder 49 and exposed for the required time. Thereafter, development of the contact print proceeds as when developing a photographic enlargement as above.

It will be readily apparent that the optical path can be lengthened or shortened by making the light-heat unit 11 and exposure unit 35 movable relative to each other as hereinbefore noted and thus obtain greater or lesser magnification of the projected image. Similarly, a cartridge type slide holder may be used instead of the single slide holder 29 illustrated in the drawings. Also, one may readily substitute a more sophisticated enlarging lens system for that disclosed herein. Various modifications and alterations of the invention will become apparent to those skilled in the art without departing from the teachings herein.

Having described our invention, we claim:

1. Apparatus for producing photographic prints of developed negatives directly on a photosensitive sheet by heat development comprising in combination, a first enclosed container having an aperture in one end thereof, an incandescent light source and a heat source within said container, an enlarging lens located adjacent to and in alignment with said aperture, means within said first container for directing a beam of light through said aperture and through said enlarging lens, means on the exterior of said first container for mounting a photographic negative between said aperture and said enlarging lens, a second enclosed container connected to said first container at their respective bases, said second container having apertures in each end thereof in alignment with said aperture in said first container, one of said apertures being adjacent to said enlarging lens, a frosted focusing screen forming at least a portion of a side of said second container perpendicular to said apertured ends and adjacent said base, a pivoted reflecting panel positioned within said second container adapted to pivot into a first position in front of said focusing screen away from the path of said directed beam of light and to pivot into a second position in the path of said light to reflect light from said light source onto said focusing screen, means mounted on the exterior of said second container to manually pivot said reflecting panel from said first position to said second position, means on the exterior of said second container for holding a photosensitive sheet across the other of said apertures of said container to which light is projected, means on said first container to heat-develop said exposed photosensitive sheet comprising a heat conductive smoothly arcuate side surface of said container and a heat resistant transparent hold down member having a handle affixed to one edge thereof, and a thermostat mounted in the said first container which regulates the temperature of said heat-developing means within a temperature range of about 185° F. and about 215° F., +2½° F.

2. Apparatus according to claim 1 wherein an incandescent bulb is both the light source and the heat source.

3. Apparatus according to claim 2 additionally comprising a micro-switch mounted interiorly of said side of said second container containing said frosted focusing screen, said reflecting panel in its first position contacting said micro-switch thereby bypassing said thermostat and energizing said incandescent light bulb for the required period of exposure.

4. Apparatus according to claim 3 wherein the frosted viewing screen is backwardly inclined.

References Cited
UNITED STATES PATENTS 3,002,434  10/1961  Reuter ---------------- 95—1.7
3,011,963  12/1961  Johnson et al.

NORTON ANSHER, Primary Examiner

R. A. WINTERCORN, Assistant Examiner

U.S. Cl. X.R.
250—65; 355—45